US008432811B2

(12) United States Patent
Park et al.

(10) Patent No.: US 8,432,811 B2
(45) Date of Patent: Apr. 30, 2013

(54) METHOD OF PERFORMING UPLINK TIME ALIGNMENT IN WIRELESS COMMUNICATION SYSTEM

(75) Inventors: Sung Jun Park, Seoul (KR); Young Dae Lee, Seoul (KR); Seung June Yi, Seoul (KR); Sung Duck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 12/678,694

(22) PCT Filed: Sep. 26, 2008

(86) PCT No.: PCT/KR2008/005717
§ 371 (c)(1), (2), (4) Date: Mar. 17, 2010

(87) PCT Pub. No.: WO2009/041784
PCT Pub. Date: Apr. 2, 2009

(65) Prior Publication Data

US 2010/0195640 A1 Aug. 5, 2010

Related U.S. Application Data

(60) Provisional application No. 60/975,819, filed on Sep. 28, 2007.

(30) Foreign Application Priority Data

Sep. 17, 2008 (KR) ........................ 10-2008-0091106

(51) Int. Cl.
*H04L 1/00* (2006.01)

(52) U.S. Cl.
USPC ............ 370/236; 370/328; 370/350; 370/252

(58) Field of Classification Search .................. 370/236, 370/252, 324, 328, 331, 350
See application file for complete search history.

(56) References Cited

U.S. PATENT DOCUMENTS 6,388,997 B1 * 5/2002 Scott ............................ 370/280
6,421,334 B1 7/2002 Baines
6,434,389 B1 8/2002 Meskanen et al.
7,209,747 B2 4/2007 Chen (Continued)

FOREIGN PATENT DOCUMENTS

JP 2000-151694 5/2000
JP 2002-268697 9/2002

(Continued)

OTHER PUBLICATIONS

United States Patent and Trademark Office U.S. Appl. No. 12/738,278, Final Office Action dated Oct. 24, 2012, 13 pages.

(Continued)

*Primary Examiner* — Kwang B Yao
*Assistant Examiner* — Nguyen Ngo
(74) *Attorney, Agent, or Firm* — Lee, Hong, Degerman, Kang & Waimey

(57) ABSTRACT

A method of performing uplink time alignment in wireless communication system includes transmitting a random access preamble, receiving a random access response, the random access response comprising a random access preamble identifier corresponding to the random access preamble but no time alignment value, and restarting a time alignment timer according to receiving the random access response.

9 Claims, 9 Drawing Sheets

U.S. PATENT DOCUMENTS

| | | | | |
|---|---|---|---|---|
| 7,310,336 | B2 | 12/2007 | Malkamaki | |
| 7,921,348 | B2 | 4/2011 | Seidel et al. | |
| 8,131,295 | B2 * | 3/2012 | Wang et al. | 455/436 |
| 8,320,327 | B2 | 11/2012 | Pani et al. | |
| 2001/0021661 | A1 | 9/2001 | Pautonnier | |
| 2001/0024956 | A1 | 9/2001 | You et al. | |
| 2002/0126629 | A1 | 9/2002 | Jiang et al. | |
| 2003/0224790 | A1 | 12/2003 | Choi | |
| 2004/0162074 | A1 | 8/2004 | Chen | |
| 2004/0208142 | A1 | 10/2004 | Saw | |
| 2005/0041681 | A1 | 2/2005 | Lee et al. | |
| 2005/0220042 | A1 | 10/2005 | Chang et al. | |
| 2005/0249163 | A1 | 11/2005 | Kim et al. | |
| 2005/0287957 | A1 | 12/2005 | Lee et al. | |
| 2006/0035662 | A1 | 2/2006 | Jeong et al. | |
| 2006/0104225 | A1 | 5/2006 | Kim et al. | |
| 2006/0116136 | A1 | 6/2006 | Noma | |
| 2006/0251023 | A1 | 11/2006 | Choi | |
| 2007/0047547 | A1 | 3/2007 | Conner et al. | |
| 2007/0049325 | A1 | 3/2007 | Lee | |
| 2007/0115894 | A1 | 5/2007 | Herrmann et al. | |
| 2007/0201424 | A1 | 8/2007 | Kobayashi et al. | |
| 2007/0202892 | A1 | 8/2007 | Voyer | |
| 2007/0250751 | A1 | 10/2007 | Cai et al. | |
| 2007/0253393 | A1 | 11/2007 | Tseng | |
| 2007/0291688 | A1 | 12/2007 | Jiang et al. | |
| 2008/0043771 | A1 * | 2/2008 | Cho et al. | 370/431 |
| 2008/0081645 | A1 | 4/2008 | Kim et al. | |
| 2008/0119209 | A1 | 5/2008 | Upp | |
| 2008/0188247 | A1 | 8/2008 | Worrall | |
| 2008/0205433 | A1 * | 8/2008 | Pihlaja et al. | 370/461 |
| 2008/0220784 | A1 | 9/2008 | Somasundaram et al. | |
| 2008/0226074 | A1 | 9/2008 | Sammour et al. | |
| 2008/0233941 | A1 * | 9/2008 | Jen | 455/418 |
| 2008/0268843 | A1 | 10/2008 | Ore et al. | |
| 2008/0318578 | A1 * | 12/2008 | Worrall | 455/437 |
| 2009/0041240 | A1 * | 2/2009 | Parkvall et al. | 380/247 |
| 2009/0086853 | A1 | 4/2009 | Ye | |
| 2009/0088160 | A1 | 4/2009 | Pani et al. | |
| 2009/0111445 | A1 | 4/2009 | Ratasuk et al. | |
| 2009/0247211 | A1 * | 10/2009 | Kuroda | 455/522 |
| 2009/0318175 | A1 * | 12/2009 | Sandberg | 455/502 |
| 2010/0077272 | A1 | 3/2010 | Peisa et al. | |
| 2010/0091721 | A1 * | 4/2010 | Larmo et al. | 370/329 |
| 2010/0093386 | A1 * | 4/2010 | Damnjanovic et al. | 455/522 |
| 2010/0178923 | A1 | 7/2010 | Yi et al. | |
| 2010/0232301 | A1 | 9/2010 | Omori | |
| 2010/0284376 | A1 | 11/2010 | Park et al. | |
| 2010/0290427 | A1 * | 11/2010 | Sebire et al. | 370/331 |
| 2011/0268234 | A1 * | 11/2011 | Khandekar et al. | 375/354 |

FOREIGN PATENT DOCUMENTS

| | | |
|---|---|---|
| JP | 2003-087317 | 3/2003 |
| JP | 2004-349882 | 12/2004 |
| JP | 2005-530463 | 10/2005 |
| JP | 2006506892 | 2/2006 |
| KR | 10-2004-0008228 | 1/2004 |
| KR | 10-2005-0014984 | 2/2005 |
| KR | 10-2005-0028254 | 3/2005 |
| KR | 10-2006-0024756 | 3/2006 |
| KR | 10-0556589 | 3/2006 |
| KR | 1020070080188 | 8/2007 |
| KR | 10-2007-0120453 | 12/2007 |
| WO | 03/027860 | 4/2003 |
| WO | 2004/004163 | 1/2004 |
| WO | 2005/091668 | 9/2005 |
| WO | 2005/122441 | 12/2005 |
| WO | 2006/035501 | 4/2006 |
| WO | 2006/096036 | 9/2006 |
| WO | 2006/118426 | 11/2006 |
| WO | 2006/118738 | 11/2006 |

OTHER PUBLICATIONS

3rd Generation Partnership Project (3GPP); "Technical Specification Group Radio Access Network; Synchronisation in UTRAN Stage 2 (Release 7)", 3GPP TS 25.402 V7.5.0, Dec. 2007.

Nokia Siemens Networks, "Change Request", R2-074504, 3GPP TSG-RAN2 Meeting #59bis, Oct. 2007.

Nokia Siemens Networks et al., "CS over HSDPA", 3GPP TSG-RAN WG2 Meeting #59bis, Oct. 2007.

Nokia Siemens Networks et al., "CS over HSPA impact to specification", R2-074017, 3GPP TSG-RAN-WG2 Meeting #59bis,Oct. 2007.

United States Patent and Trademark Office U.S. Appl. No. 12/677,739, Office Action dated Dec. 21, 2012, 9 pages.

United States Patent and Trademark Office U.S. Appl. No. 12/811,613, Office Action dated Dec. 28, 2012, 10 pages.

* cited by examiner

[Fig. 1]
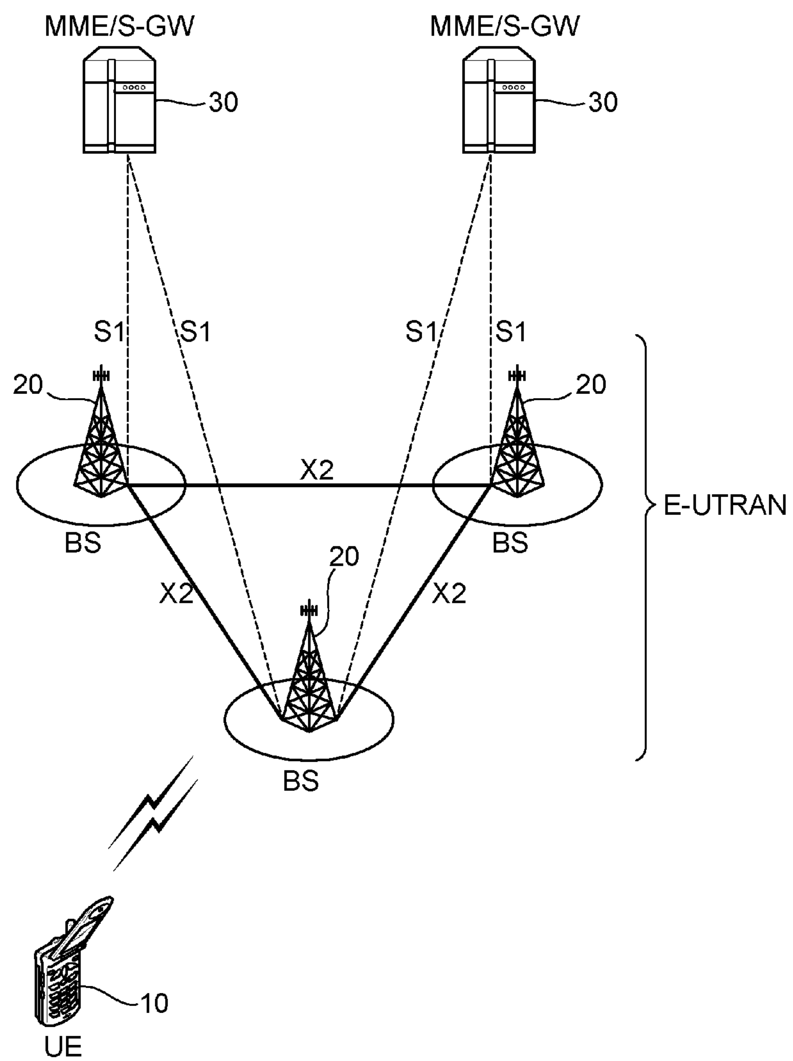

[Fig. 2]
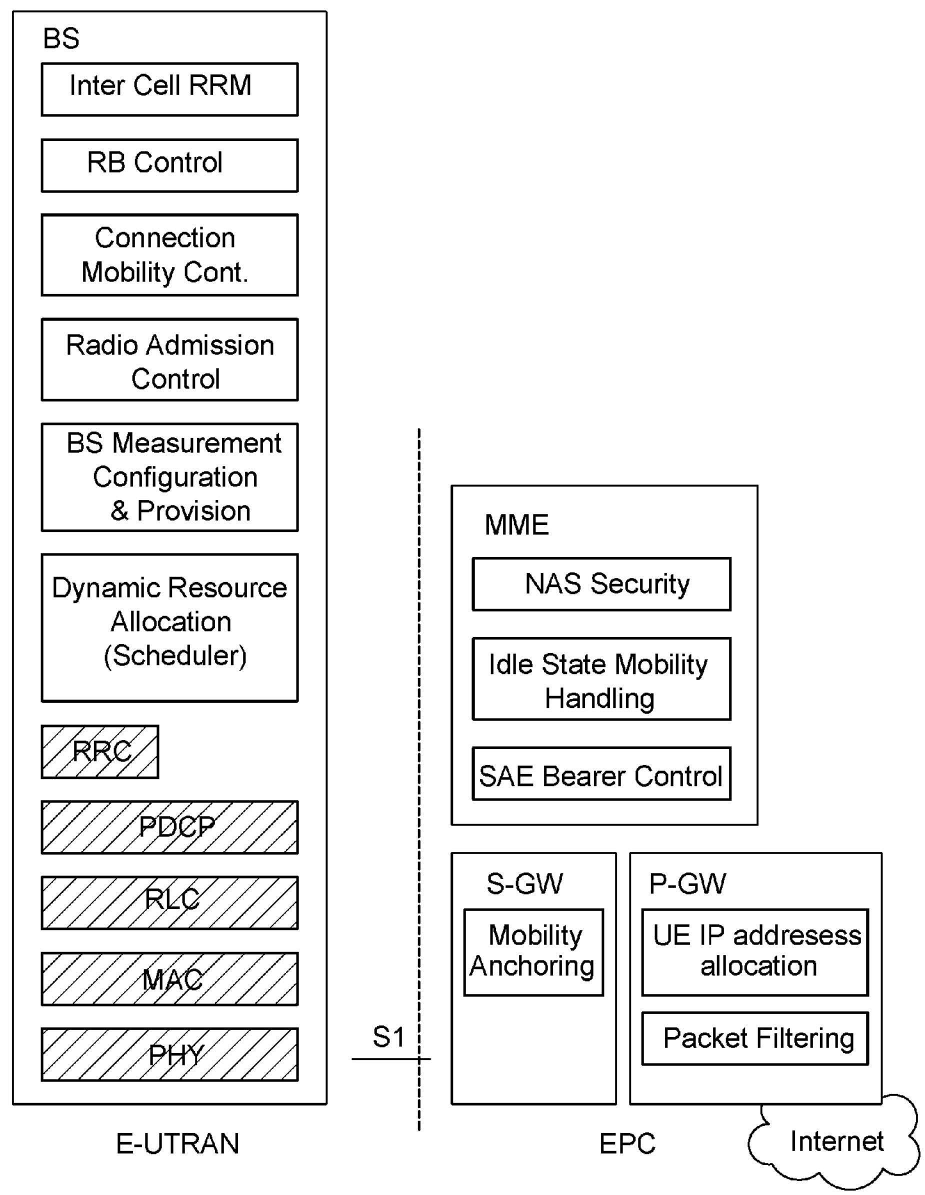

[Fig. 3]
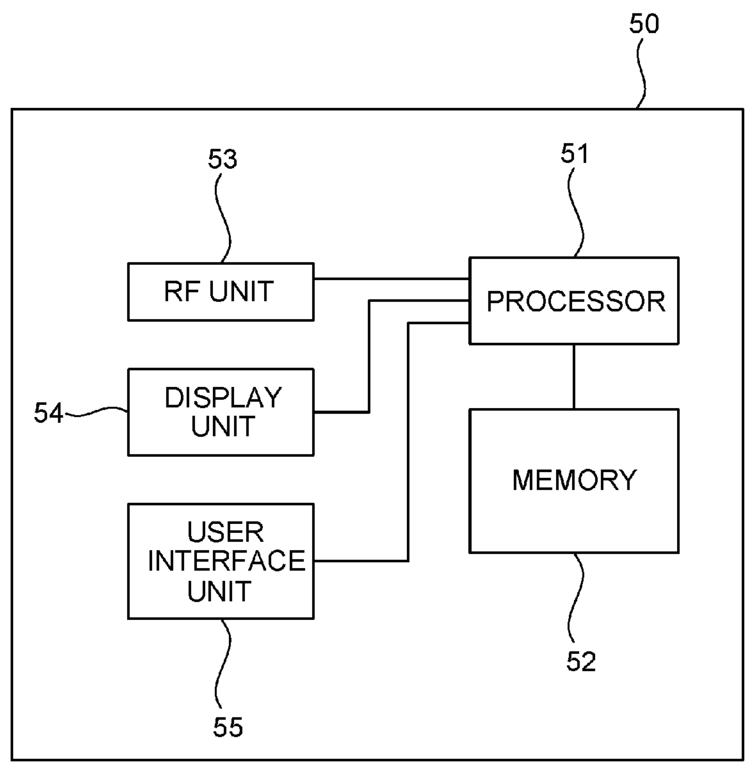
[Fig. 4]
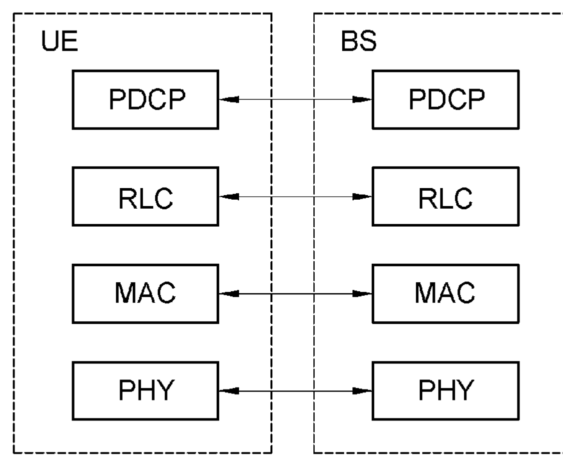

[Fig. 5]
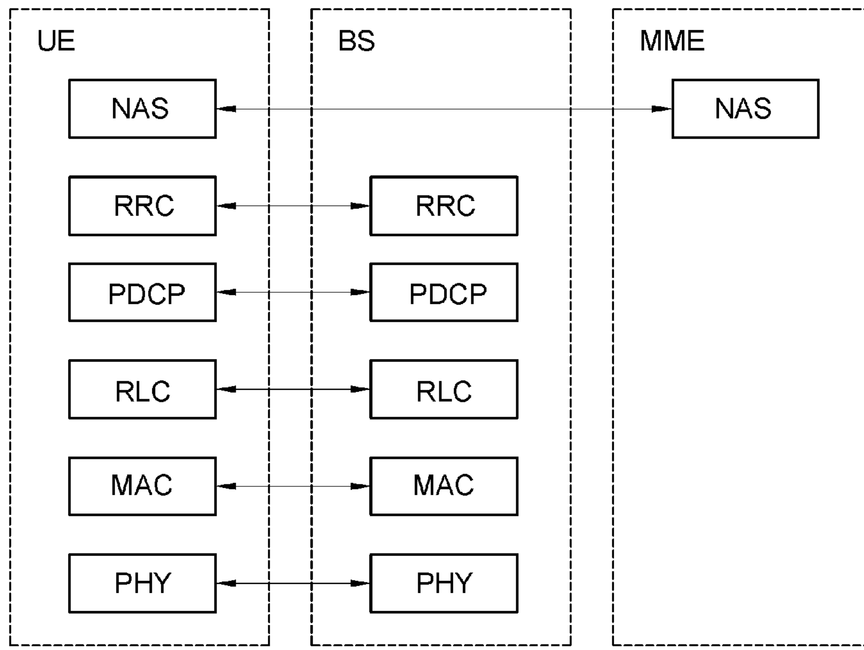
[Fig. 6]
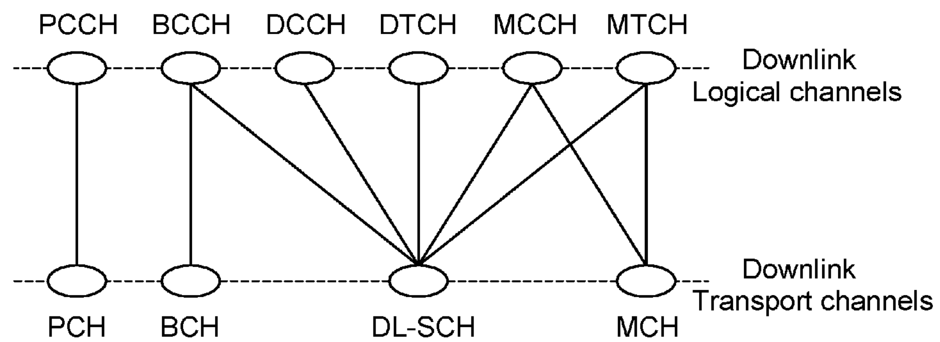
[Fig. 7]
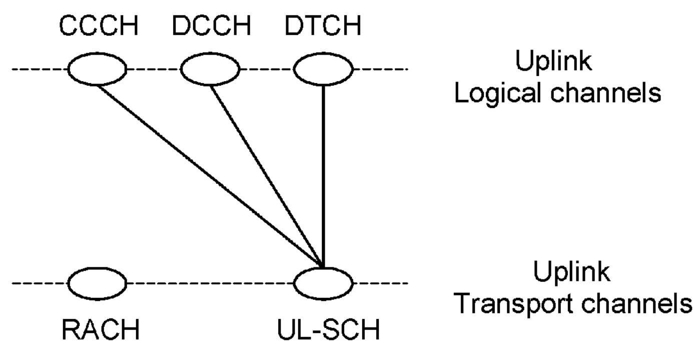

[Fig. 8]
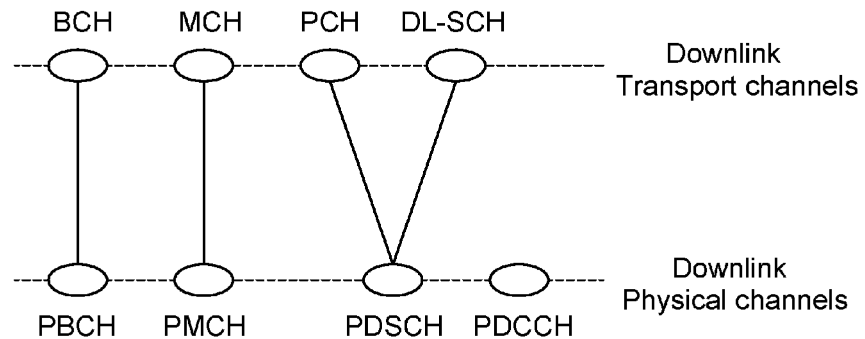
[Fig. 9]
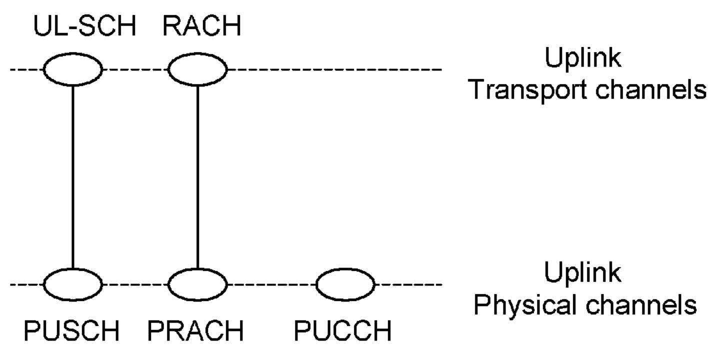
[Fig. 10]
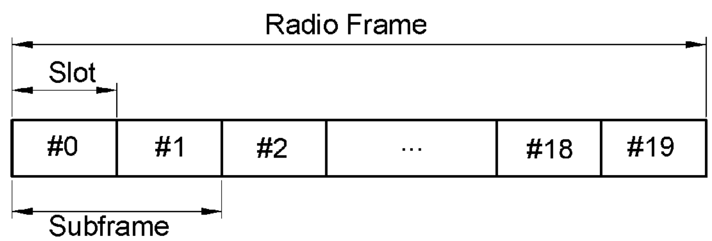

[Fig. 11]
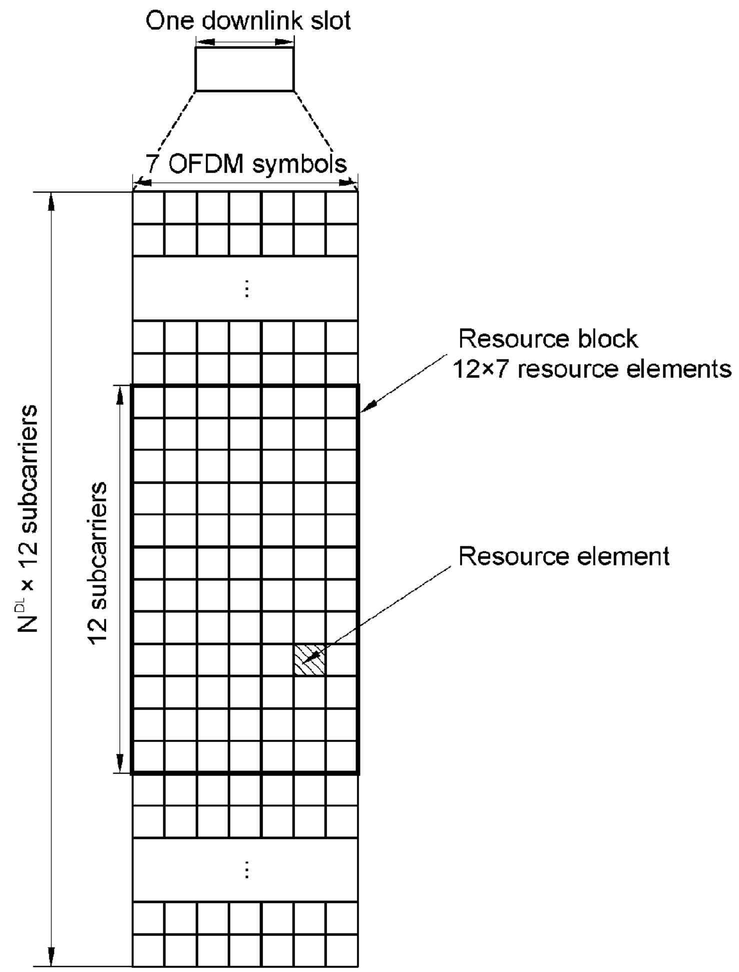
[Fig. 12]
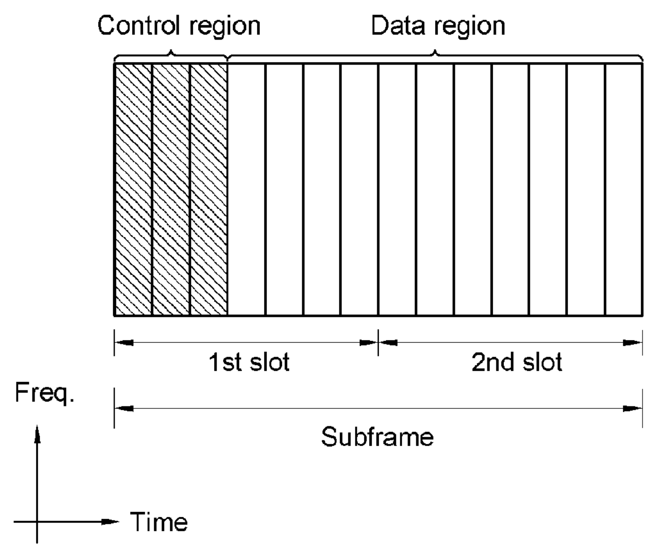

[Fig. 13]
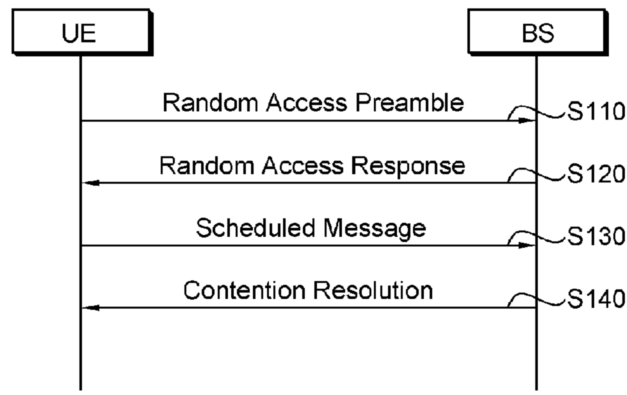
[Fig. 14]
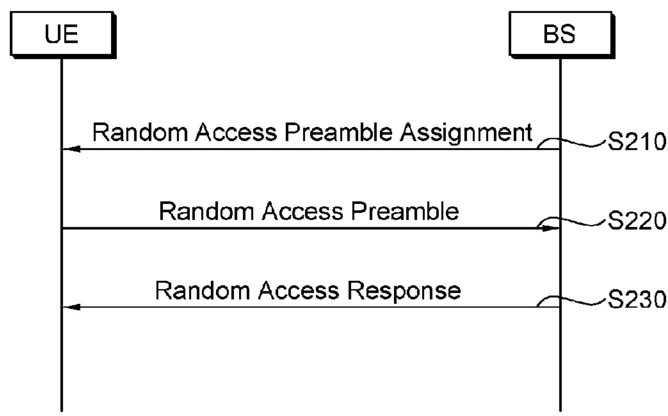
[Fig. 15]
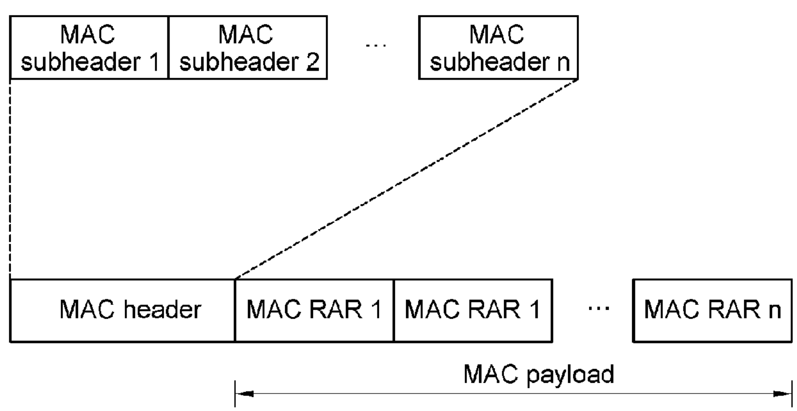
[Fig. 16]
| E | T | RAPID | Oct 1 |
|---|---|---|---|

[Fig. 17]
| E | T | R | R | BI | |
|---|---|---|---|---|---|
| | | | | | Oct 1 |
[Fig. 18]
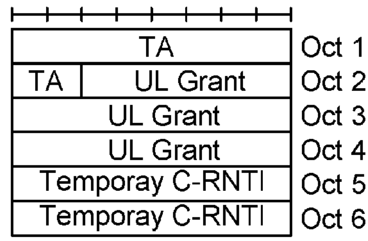
[Fig. 19]
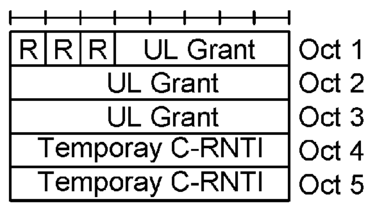
[Fig. 20]
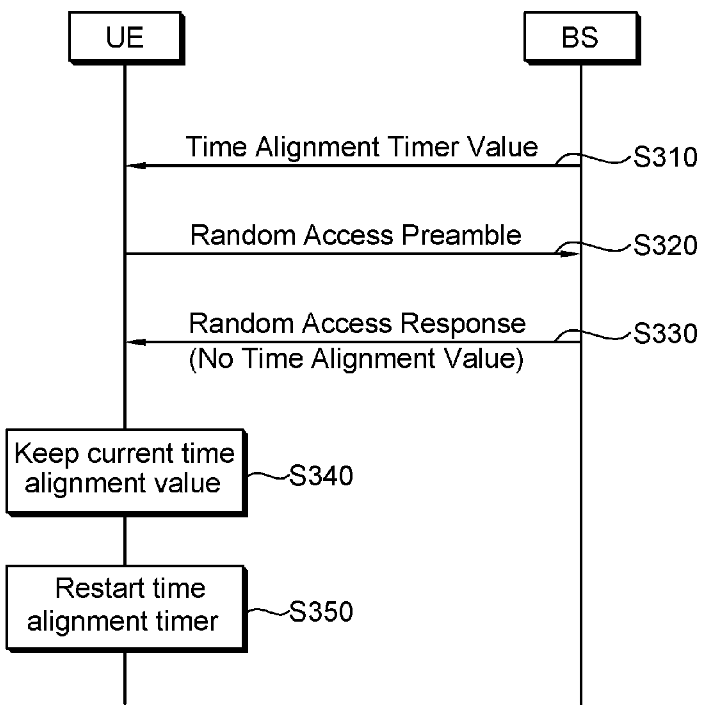

[Fig. 21]
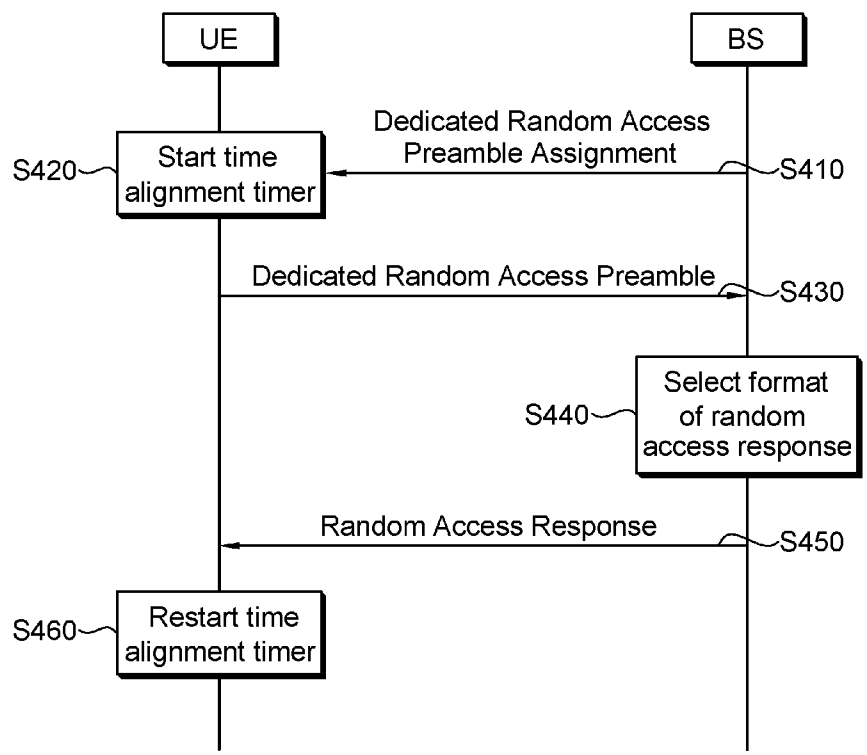

METHOD OF PERFORMING UPLINK TIME ALIGNMENT IN WIRELESS COMMUNICATION SYSTEM

CROSS-REFERENCE TO RELATED APPLICATIONS

This application is the National Stage filing under 35 U.S.C. §371 of International Application No. PCT/KR2008/005717, filed on Sep. 26, 2008, which claims the benefit of earlier filing date and right of priority to Korean Application No. 10-2008-0091106, filed on Sep. 17, 2008, and also claims the benefit of U.S. Provisional Application Ser. No. 60/975,819, filed on Sep. 28, 2007.

TECHNICAL FIELD

The present invention relates to wireless communication, and more particularly, to a method of uplink time alignment between a base station and a user equipment in a wireless communication system.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment (UE), and the like are defined as requirements.

In general, there are one or more cells within the coverage of a base station (BS). One cell may include a plurality of UEs. A UE is generally subjected to a random access procedure to access a network. The random access procedure is performed by the UE for the purposes of initial access, handover, scheduling request, timing alignment, etc.

The random access procedure can be classified into a contention based random access procedure and a non-contention based random access procedure. A greatest difference between the two random access procedures lies in whether a random access preamble is dedicatedly assigned to one UE. In the non-contention based access procedure, since a UE uses only the random access preamble dedicatedly assigned to the UE, contention (or collision) with another UE does not occur. The contention occurs when two or more UEs attempt the random access procedure by using the same random access preamble through the same resource. In the contention based random access procedure, there is a possibility of contention since a random access preamble used by the UEs is randomly selected.

In a wireless communication system, time alignment between a UE and a BS is important so as to minimize interference between users. The random access procedure is performed for uplink alignment. While the random access procedure is performed, the UE is time-aligned according to a time alignment value transmitted from the BS. When uplink alignment is achieved, the UE starts a time alignment timer. If the time alignment timer is running, it is regarded that the UE and the BS are uplink-aligned with each other. If the time alignment timer expires or is not running, it is regarded that the UE and the BS are not aligned with each other. In this case, uplink transmission cannot be achieved except for transmission of the random access preamble.

If the time alignment value is always included in a random access response, upon receiving the random access response, the UE starts or restarts the time alignment timer after applying the time alignment value. Uplink time alignment management is not always required in the random access procedure according to a cell size.

For example, in case of a cell having a significantly large coverage, a distance between the BS and the UE can be significantly far. Thus, a time alignment determined by the BS may differ from a time point of receiving uplink data transmitted by the UE. Accordingly, the uplink time alignment management is necessary. In comparison thereto, in case of a cell having a relatively small coverage such as a femto-cell or an indoor BS, the distance between the BS and the UE is not significantly far. Thus, it may not be necessary to adjust the time alignment during the random access procedure. After the uplink alignment is achieved, the time alignment can be exactly maintained in most of UEs without time correction.

In case of a cell having a small coverage, if the time alignment value is unnecessarily included in the random access response, there is a problem in that radio resources are wasted to transmit the random access response.

DISCLOSURE OF INVENTION

Technical Problem

A method is sought for restarting a time alignment timer without additional signaling in a wireless communication system.

A method is also sought for reducing an amount of radio resource required to transmit a random access response in a wireless communication system.

Technical Solution

In an aspect, a method of performing uplink time alignment in wireless communication system includes transmitting a random access preamble, receiving a random access response, the random access response comprising a random access preamble identifier corresponding to the random access preamble but no time alignment value, and restarting a time alignment timer according to receiving the random access response.

The random access preamble may be a dedicated random access preamble which is previously assigned by a base station. The time alignment timer may be running before the random access preamble is transmitted.

The value of the time alignment timer and the random access preamble may be received as a part of system information or through a handover command message.

The random access response may be a MAC (medium access control) PDU (protocol data unit) which includes a MAC header and at least one MAC random access response (RAR), the MAC header comprising at least MAC subheader, each MAC subheader corresponding to a MAC RAR, a MAC subheader comprising the random access preamble identifier.

In another aspect, a method of performing uplink time alignment in wireless communication system includes transmitting a dedicated random access preamble, receiving a random access response, the random access response comprising a random access preamble identifier corresponding to the dedicated random access preamble, and restarting a time alignment timer according to receiving the random access response.

Advantageous Effects

A time alignment timer can be restarted without additional signaling for time correction. An amount of radio resource required to transmit a random access response can be reduced. A time alignment value can be prevented from being unnecessarily transmitted to a user equipment which is uplink aligned in a cell having a small coverage.

BRIEF DESCRIPTION OF THE DRAWINGS

FIG. 1 shows a structure of a wireless communication system.

FIG. 2 is a block diagram showing functional split between an evolved universal terrestrial radio access network (E-UTRAN) and an evolved packet core (EPC).

FIG. 3 is a block diagram showing constitutional elements of a user equipment.

FIG. 4 is a diagram showing a radio protocol architecture for a user plane.

FIG. 5 is a diagram showing a radio protocol architecture for a control plane.

FIG. 6 shows mapping between downlink logical channels and downlink transport channels.

FIG. 7 shows mapping between uplink logical channels and uplink transport channels.

FIG. 8 shows mapping between downlink transport channels and downlink physical channels.

FIG. 9 shows mapping between uplink transport channels and uplink physical channels.

FIG. 10 shows a structure of a radio frame.

FIG. 11 shows an example of a resource grid for one downlink slot.

FIG. 12 shows a structure of a subframe.

FIG. 13 is a flow diagram showing a contention based random access procedure.

FIG. 14 is a flow diagram showing a non-contention based random access procedure.

FIG. 15 shows a structure of a medium access control (MAC) protocol data unit (PDU) for a random access response.

FIG. 16 shows a random access preamble identifier (RAPID) MAC subheader.

FIG. 17 shows a backoff indicator (BI) MAC subheader.

FIG. 18 shows a MAC random access response (RAR).

FIG. 19 shows a MAC RAR according to an embodiment of the present invention.

FIG. 20 is a flow diagram showing a random access procedure according to an embodiment of the present invention.

FIG. 21 is a flow diagram showing a method of performing uplink time alignment according to an embodiment of the present invention.

MODE FOR THE INVENTION

FIG. 1 shows a structure of a wireless communication system. The wireless communication system may have a network structure of an evolved-universal mobile telecommunications system (E-UMTS). The E-UMTS may be referred to as a long-term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

FIG. 2 is a block diagram showing functional split between the E-UTRAN and the EPC. Slashed boxes depict radio protocol layers and white boxes depict the functional entities of the control plane.

Referring to FIG. 2, the BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) non-access stratum (NAS) signaling; (2) NAS signaling security; (3) idle mode UE reachability; (4) tracking area list management; (5) roaming; and (6) authentication.

The S-GW performs the following functions: (1) mobility anchoring; and (2) lawful interception. The PDN gateway (P-GW) performs the following functions: (1) UE IP allocation; and (2) packet filtering.

FIG. 3 is a block diagram showing constitutional elements of the UE. A UE 50 includes a processor 51, a memory 52, a radio frequency (RF) unit 53, a display unit 54 and a user interface unit 55. Layers of the radio interface protocol are implemented in the processor 51. The processor 51 provides the control plane and the user plane. The function of each layer can be implemented in the processor 51. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into L1 layer (a first layer), L2 layer (a second layer), and L3 layer (a third layer) based on the lower three layers of the open system interconnection (OSI)

model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

FIG. 4 is a diagram showing a radio protocol architecture for the user plane. FIG. 5 is a diagram showing a radio protocol architecture for the control plane. They illustrate an architecture of a radio interface protocol between the UE and the E-UTRAN. The user plane is a protocol stack for user data transmission. The control plane is a protocol stack for control signal transmission.

Referring to FIGS. 4 and 5, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data are transferred through the physical channel.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports retransmission when the transfer of the RLC protocol data unit (PDU) fails.

A packet data convergence protocol (PDCP) layer belongs to the second layer and performs a header compression function for reducing an IP packet header size.

A radio resource control (RRC) layer belongs to the third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

FIG. 6 shows mapping between downlink logical channels and downlink transport channels. FIG. 7 shows mapping between uplink logical channels and uplink transport channels.

Referring to FIGS. 6 and 7, in downlink, a paging control channel (PCCH) is mapped to a paging channel (PCH). A broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and MTCH are also mapped to a multicast channel (MCH). In uplink, the CCCH, the DCCH, and the DTCH are mapped to an uplink shared channel (UL-SCH).

A type of each logical channel is defined according to a type of information to be transmitted. A logical channel is classified into two groups, i.e., a control channel and a traffic channel.

The control channel is used for transfer of control plane information. The BCCH is a downlink control channel for broadcasting system control information. The PCCH is a downlink channel for transmitting paging information and is used when a network does not know the location of a UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information from the network to the UE. The MCCH is used by UEs that receive an MBMS. The DCCH is a point-to-point bi-directional channel for transmitting dedicated control information between the UE and the network, and is used by UEs having an RRC connection.

The traffic channel is used for the transfer of user plane information. The DTCH is a point-to-point channel dedicated to one UE and is used for the transfer of user information. The DTCH can exist in both uplink and downlink. The MTCH is a point-to-multipoint downlink channel for transmitting traffic data from the network to the UE and is used by the UEs that receive the MBMS.

The transport channel is classified according to a type and characteristic of data transmission through a radio interface. The BCH is broadcast in the entire coverage area of the cell and has a fixed, pre-defined transport format. The DL-SCH is characterized by support for hybrid automatic repeat request (HARQ), support for dynamic link adaptation by varying modulation, coding, and transmit (Tx) power, possibility to be broadcast in the entire cell, and possibility to use beamforming, support for both dynamic and semi-static resource allocation, support for UE discontinuous reception (DRX) to enable UE power saving, and support for MBMS transmission. The PCH is characterized by support for DRX to enable UE power saving and requirement to be broadcast in the entire coverage area of the cell. The MCH is characterized by support for requirement to be broadcast in the entire coverage area of the cell and support for an MBMS single frequency network (MBSFN).

The UL-SCH and a random access channel (RACH) are uplink transport channels. The UL-SCH is characterized by support for dynamic link adaptation for changing the modulation, coding, and Tx power and support for HARQ and dynamic/semi-static resource allocation. The RACH is characterized by limited control information and collision risk.

FIG. 8 shows mapping between downlink transport channels and downlink physical channels. FIG. 9 shows mapping between uplink transport channels and uplink physical channels.

Referring to FIGS. 8 and 9, in downlink, a BCH is mapped to a physical broadcast channel (PBCH). An MCH is mapped to a physical multicast channel (PMCH). A PCH and a DL-SCH are mapped to a physical downlink shared channel (PDSCH). The PBCH carries a BCH transport block. The PMCH carries the MCH. The PDSCH carries the DL-SCH and the PCH. In uplink, a UL-SCH is mapped to a physical uplink shared channel (PUSCH). An RACH is mapped to a physical random access channel (PRACH). The PRACH carries a random access preamble.

There are several physical control channels used in a PHY layer. A physical downlink control channel (PDCCH) informs a UE of resource allocation of the PCH and DL-SCH, and also informs the UE of HARQ information related to the DL-SCH. The PDCCH may carry an uplink scheduling grant which informs the UE of resource allocation for uplink transmission. A physical control format indicator channel (PCFICH) informs the UE of the number of orthogonal frequency division multiplexing (OFDM) symbols used for the PDCCHs and is transmitted in every subframe. A physical hybrid ARQ indicator channel (PHICH) carries HARQ acknowledgement (ACK)/negative-acknowledgement (NACK) signals in response to uplink transmission. A physical uplink control channel (PUCCH) carries HARQ ACK/NACK signals in response to downlink transmission, scheduling request, and uplink control information (e.g., a channel quality indicator (CQI)).

FIG. 10 shows a structure of a radio frame.

Referring to FIG. 10, the radio frame includes 10 subframes. One subframe includes two slots. A time for transmitting one subframe is defined as a transmission time interval (TTI). For example, one subframe may have a length of 1 ms, and one slot may have a length of 0.5 ms.

The radio frame of FIG. 10 is shown for exemplary purposes only. Thus, the number of subframes included in the radio frame or the number of slots included in the subframe or the number of OFDM symbols included in the slot may change variously.

FIG. 11 shows an example of a resource grid for one downlink slot.

Referring to FIG. 11, the downlink slot includes a plurality of OFDM symbols in a time domain. Although it is described herein that one downlink slot includes 7 OFDM symbols and one resource block includes 12 subcarriers in a frequency domain, this is for exemplary purposes only, and thus the present invention is not limited thereto.

Elements on the resource grid are referred to as resource elements. One resource block includes 12×7 resource elements. The number NDL of resource blocks included in the downlink slot depends on a downlink transmission bandwidth determined in a cell.

FIG. 12 shows a structure of a subframe.

Referring to FIG. 12, the subframe includes 2 consecutive slots. A maximum of 3 OFDM symbols located in a front portion of a 1st slot within the subframe correspond to a control region to be assigned with a PDCCH. The remaining OFDM symbols correspond to a data region to be assigned with a PDSCH. A PCFICH carries information regarding the number of OFDM symbols used to transmit PDCCHs within the subframe.

Hereinafter, a random access procedure will be described.

First, a UE can perform the random access procedure on a BS for the following reasons.

(1) When the UE performs initial access since there is no RRC connection with the BS.

(2) When the UE first accesses to a target cell in a handover procedure.

(3) When it is requested by the command of the BS.

(4) When uplink data is generated in a condition where uplink time alignment is not adjusted or where uplink radio resource is not allocated.

(5) When a recovery procedure is performed due to radio link failure or handover failure.

The random access procedure can be classified into a contention based random access procedure and a non-contention based random access procedure. A greatest difference between the two random access procedures lies in whether a random access preamble is dedicatedly assigned to one UE. In the non-contention based access procedure, since the UE uses only the random access preamble dedicatedly assigned to the UE, contention (or collision) with another UE does not occur. The contention occurs when two or more UEs attempt the random access procedure by using the same random access preamble through the same resource. In the contention based random access procedure, there is a possibility of contention since a random access preamble used by the UEs is randomly selected. In addition, the non-contention based random access procedure can be used only when it is requested by the command of the BS or requested in the handover procedure among the aforementioned reasons of performing the random access procedure.

FIG. 13 is a flow diagram showing a contention based random access procedure.

Referring to FIG. 13, in step S110, a UE randomly selects one random access preamble from a set of random access preambles, and transmits the selected random access preamble to a BS by using a PRACH resource. Information on the set of random access preambles can be obtained from the BS by using a part of system information or a handover command message.

In step S120, the UE attempts to receive its random access response within a random access response reception window. The random access response reception window can be specified by the part of system information or the handover command message. The random access response reception window denotes a window for monitoring the random access response. More specifically, the random access response is transmitted in a format of a MAC PDU. The MAC PDU is delivered through a PDSCH that is a physical channel. Reception information of the PDSCH is obtained through a PDCCH that is a control channel. The PDCCH carries information of the UE for receiving the PDSCH, radio resource allocation information of the PDSCH, a transport format of the PDSCH, etc. The UE monitors the PDCCH within a subframe included in the random access response reception window, and upon successfully receiving the PDCCH, receives the random access response on the PDSCH specified by the PDCCH.

The random access response includes a time alignment (TA) value for uplink alignment of the UE, uplink radio resource allocation information, and a temporary UE identifier for identifying UEs performing the random access. The temporary UE identifier may be a random access preamble identifier (RAPID) or a temporary cell-radio network temporary identity (C-RNTI). The RAPID is used to identify a received random access preamble.

In step S130, after applying the TA value, the UE transmits to the BS a scheduled message including the random access identifier by using the uplink radio resource allocation information. According to the TA value, the UE starts or restarts a time alignment timer. The time alignment timer is restarted if it has been running from a previous stage. Otherwise, the time alignment timer is started.

The random access identifier is used to identify the UE for which the BS performs the random access procedure. The random access identifier can be obtained in two ways. First, when the UE already has an effective cell identifier (e.g., C-RNTI) assigned in a corresponding cell before the random access procedure, the cell identifier is used as the random access identifier. Second, when the effective cell identifier is not assigned to the UE before the random access procedure, the UE uses its unique identifier (i.e., system architecture evolution (SAE) temporary mobile station identifier (S-TMSI) or an upper layer identifier) as the random access identifier. The UE starts a contention resolution timer upon transmitting the scheduled message.

In step S140, after receiving the scheduled message, the BS transmits to the UE a contention resolution message including the random access identifier.

In the contention based random access procedure, contention occurs because the number of available random access preambles is limited. Unique random access preambles cannot be assigned to all UEs in the cell. Thus, the UE randomly selects one random access preamble from the set of random access preambles and then transmits the selected random access preamble. As a result, two or more UEs may select and transmit the same random access preamble by using the same PRACH resource. This is a case where the contention occurs. Upon receiving the random access preamble, the BS transmits a random access response for the random access preamble in a state that the BS cannot know whether the contention occurs. However, since the contention occurs, two or more UEs receive the same random access response, and the UEs respectively transmit scheduled messages on the basis of information included in the random access response. This means that the two or more UEs transmit different scheduled messages by using the uplink radio resource allocation information included in the random access response. In this case, both of the two scheduled messages may not be successfully transmitted, or only either one of the two scheduled messages may be successfully received for a specific UE according to Tx power. If the BS successfully receives the scheduled message, the BS transmits the contention resolution message by using the random access identifier included in the scheduled message. Upon receiving the random access identifier of the UE, the UE can know that the contention resolution is successful. The contention resolution is defined as an operation whereby the UE can know a success or failure of contention in the contention based random access procedure.

The contention resolution timer is used for the contention resolution. The contention resolution timer is started after receiving the random access response. The contention resolution timer may be started when the UE transmits the scheduled message. When the contention resolution timer expires, the contention resolution is determined to be a failure, and thus a new random access procedure starts. Upon receiving the contention resolution message including the random access identifier of the UE, the contention resolution timer stops, and the contention resolution is determined to be a success. If the UE has the unique cell identifier (e.g., C-RNTI) before the random access procedure, the UE transmits the scheduled message including the cell identifier of the UE and thereafter starts the contention resolution timer. If the UE receives a PDCCH addressed by the cell identifier of the UE before the contention resolution timer expires, the UE determines that the UE has succeeded in the contention, and then properly finishes the random access procedure. Alternatively, if the UE does not have the C-RNTI, the upper layer identifier may be used as the random access identifier. The UE transmits the scheduling message including the upper layer identifier and thereafter starts the contention resolution timer. If the UE receives on a DL-SCH the contention resolution message including the upper layer identifier of the UE before the contention resolution timer expires, the UE determines that the random access procedure is successful. The contention resolution message is received using the PDCCH addressed by the temporary C-RNTI. However, if the UE cannot receive on the DL-SCH the contention resolution message including the random access identifier of the UE until the contention resolution timer expires, the UE determines that the UE has failed in the contention.

FIG. 14 is a flow diagram showing a non-contention based random access procedure.

Referring to FIG. 14, in step S210, a BS assigns a dedicated random access preamble to a UE. For the non-contention based random access procedure, the BS needs to assign the dedicated random access preamble to the UE without a possibility of collision. The dedicated random access preamble may be included in a handover command message or may be transmitted on a PDCCH. If the random access procedure is performed during a handover procedure, the UE can obtain the dedicated random access preamble from the handover command message. If the random access procedure is performed at the request of the BS, the UE can obtain the dedicated random access preamble through the PDCCH.

In step S220, the UE transmits the dedicated random access preamble to the BS by using a PRACH resource.

In step S230, the UE receives a random access response corresponding to the dedicated random access preamble. In comparison with the aforementioned contention based random access procedure, the non-contention based random access procedure is carried out as follows: the random access response is received; whether the random access procedure is properly performed is determined; and the random access procedure is finished.

Hereinafter, uplink time alignment will be described. In a wireless communication system, time alignment between a UE and a BS is important so as to minimize interference between users.

A random access procedure is one of methods for tracking uplink time alignment. The BS measures a time alignment (TA) value by using a random access preamble transmitted by the UE, and provides the TA value to the UE by using a random access response. Upon receiving the random access response, the UE starts a time alignment timer after applying the TA value. The time alignment between the BS and the UE is maintained while the time alignment timer is running. When the time alignment timer expires or does not run, it is regarded that the time alignment between the UE and the BS is not maintained. If contention occurs in the contention based random access procedure and the UE fails in the contention, the UE can stop the time alignment timer. If the time alignment timer expires or does not run, the UE cannot perform any uplink transmission except for the random access preamble.

FIG. 15 shows a structure of a MAC PDU for a random access response. The MAC PDU includes a MAC header and a MAC payload. The MAC payload includes at least one MAC random access response (RAR). The MAC header includes at least one MAC subheader. The MAC subheader is divided into an RAPID MAC subheader and a backoff indicator (BI) MAC subheader. Each RAPID MAC subheader corresponds to one MAC RAR.

FIG. 16 shows the RAPID MAC subheader. An extension (E) field is a flag for indicating whether other fields exit in the MAC header. A type (T) field is a flag for indicating whether the MAC subheader includes an RAPID or a BI. An RAPID field is used to identify a transmitted random access preamble.

FIG. 17 shows the BI MAC subheader. An extension (E) field is a flag for indicating whether other fields exit in the MAC header. A type (T) field is a flag for indicating whether the MAC subheader includes an RAPID or a BI. A reserved (R) field indicates a reserved bit. A BI field is used to identify a time at which a next random access is performed according to an overload state.

FIG. 18 shows the MAC RAR. The MAC RAR includes information regarding each random access preamble response. A time alignment (TA) field indicates control required for uplink transmission timing used for timing alignment. An uplink (UL) grant field indicates resources used in uplink transmission. A temporary C-RNTI indicates a temporary indicator used by a UE during random access.

According to the random access response configured as described above, the TA value is always included in the random access response, and the UE starts or restarts the time alignment timer upon receiving the random access response.

Uplink time alignment management is not always required according to a cell size. For example, in case of a cell having a significantly large coverage, a distance between the BS and the UE can be significantly far. Thus, a time alignment determined by the BS may differ from a time point of receiving uplink data transmitted by the UE. Accordingly, the uplink time alignment management is necessary. In comparison thereto, in case of a cell having a relatively small coverage, the distance between the BS and the UE is not significantly far. Thus, it may not be necessary to adjust time alignment during the random access procedure. This is because the time alignment can be exactly maintained in most of UEs without time correction. In case of a cell having a small coverage, if the TA value is unnecessarily transmitted during the random access procedure, radio resources may be wasted to transmit the MAC PDU of the random access response.

According to an embodiment of the present invention, even if the TA value is not included in a specific control signal, the UE restarts the time alignment time by determining that a current time alignment is correct. The specific control signal may be a random access response used in the random access procedure. If the UE determines that the current time alignment is correct, it means that a provided TA value is equal to a current TA value of the UE.

According to another embodiment of the present invention, a value of a time alignment timer may be set to infinity by using a handover command message or a part of system information transmitted from the BS. In this case, even if a specific TA value is not provided, the UE can restart the time alignment timer by determining that a current time alignment is correct.

For example, if the UE receives the infinite TA value as the part of system information, the UE starts or restarts the time alignment timer. Alternatively, if the UE is instructed that the value of the time alignment timer used in a target cell is set to infinity by using the handover command message, the UE starts or restarts the time alignment timer after a handover is made to the target cell. That is, it means that the UE starts or restarts the time alignment timer when the handover command is received.

In a general contention based random access procedure, upon occurrence of contention, the UE can stop the time alignment timer when the UE fails in the contention. However, according to the present invention, if the value of the time alignment timer is set to infinity by using the part of system information or the handover command message, even in a case where contention occurs in the contention based random access procedure and the UE fails in the contention, the UE may not stop the time alignment timer.

According to still another embodiment of the present invention, if the value of the time alignment timer is set to infinity by using the part of system information or the handover command message, the UE can restart the time alignment timer upon receiving the random access response. If the TA value is included in the random access response, the time alignment timer is started or restarted after applying the TA value. However, according to the present invention, even if the TA value is not included in the random access response, the time alignment timer can be restarted when the random access response is received.

FIG. 19 shows a MAC RAR according to an embodiment of the present invention. The MAC RAR includes a temporary C-RNTI and a UL grant field. The UL grant field is information regarding uplink radio resource allocation. The MAC RAR does not include a TA field.

If the UE determines that the value of the time alignment timer has a unique value by using the part of system information or the handover command message, the random access response includes the MAC RAR of FIG. 18. If the value of the time alignment timer is set to infinity, the random access response includes the MAC RAR of FIG. 19. According to whether the value of the time alignment timer is finite or infinite, the UE use a suitable format of the random access response.

According to the value of the time alignment timer included in the handover command message or the part of system information provided by the BS, the UE can distinguish the random access response format used without special signaling in association with the random access response format.

FIG. 20 is a flow diagram showing a random access procedure according to an embodiment of the present invention.

Referring to FIG. 20, in step S310, a UE receives a value of a time alignment timer. The time alignment timer value may be received from a BS by using system information or a handover command. It is assumed herein that the time alignment timer value is set to infinity. The BS may assign a dedicated random access preamble to the UE by using an extra message or together with the time alignment timer value. Upon receiving the time alignment timer value, the UE can start the time alignment timer.

In step S320, the UE transmits the random access preamble to the BS. In case of the non-contention based random access procedure, the UE can transmit a dedicated random access preamble which is previously assigned.

In step S330, the UE receives a random access response for the random access preamble from the BS. Since the time alignment timer value is currently set to infinity, the UE can implicitly know that a time alignment value is not included in the random access response.

In step S340, after receiving the random access response not including the time alignment value, the UE determines that the current time alignment value is correct and thus maintains the current time alignment value.

In step S350, the UE restarts the time alignment timer. Thus, uplink alignment is maintained without change.

The BS can provide services to at least one cell. A cell having a small coverage may be used in the present invention. Such a cell can be referred to as a femto-cell, a home nodeB, a home e-nodeB, or a closed subscriber group (CSG). The UE can be configured to distinguish the random access response format according to a size of a serving cell. For example, if the current serving cell is the CSG cell, although the time alignment value is not included in the random access response in the non-contention based random access procedure, the UE can restart the time alignment timer upon receiving the random access response.

FIG. 21 is a flow diagram showing a method of performing uplink time alignment according to an embodiment of the present invention.

Referring to FIG. 21, in step S410, a BS assigns a dedicated random access preamble to a UE. The dedicated random access preamble may be included in a handover command message or may be transmitted on a PDCCH. If the random access procedure is performed during a handover procedure, the UE can obtain the dedicated random access preamble from the handover command message. If the random access procedure is performed at the request of the BS, the UE can obtain the dedicated random access preamble through the PDCCH.

In step S420, the UE starts a time alignment timer. To start the time alignment timer, the UE can receive a value of the time alignment timer from the BS. The time alignment timer value may be received from the BS by using a part of system information or a handover command message. The time alignment timer may be started before or after the dedicated random access preamble is assigned. A time at which the time alignment timer is started is not limited by the dedicated random access preamble assignment.

In step S430, the UE transmits the dedicated random access preamble to the BS.

In step S440, the BS selects a format of the random access response. The random access response may have a format 1 including a time alignment value or a format 2 not including the time alignment value. For example, the random access response format 1 may include the MAC RAR of FIG. 18, and the random access response format 2 may include the MAC RAR of FIG. 19. Which format of the random access response will be selected may depend on various rules. In one embodiment, the random access response format 2 may be selected upon receiving the dedicated random access preamble, and the random access response format 1 may be selected upon receiving other random access preambles. In another embodiment, the random access response formats can be selected according to the time alignment timer value. For one example, the random access response format 2 is selected if the time alignment timer value is set to infinity. For another example, the random access response formats may be selected according to system information.

In step S450, the BS transmits the random access response configured according to the selected random access response format. It is assumed herein that the BS transmits the random access response according to the random access response format 2 when the dedicated access response is received. Since the UE transmits the dedicated random access preamble of the UE itself, the UE can implicitly know that the random access response is received according to the random access response format 2.

In step S460, the UE restarts the time alignment timer when the UE receives the random access response not including the time alignment value. Therefore, uplink alignment is maintained without change.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of performing uplink time alignment in a wireless communication system, the method comprising:

receiving a value of a time alignment timer from a base station, the value of the time alignment timer set to infinity in order to indicate that a current time alignment is correct;

transmitting a random access preamble to the base station;

receiving a random access response from the base station, the random access response comprising a random access preamble identifier corresponding to the random access preamble but no time alignment value; and restarting the time alignment timer.

2. The method of claim 1, wherein the random access preamble is a dedicated random access preamble which is previously assigned by the base station.

3. The method of claim 1, wherein the time alignment timer is running before the random access preamble is transmitted.

4. The method of claim 1, wherein the time alignment timer is restarted after receiving the value of the time alignment timer from the base station.

5. The method of claim 1, wherein the time alignment timer is restarted after receiving the random access response from the base station.

6. The method of claim 1, wherein the value of the time alignment timer is received as a part of system information.

7. The method of claim 1, wherein the value of the time alignment timer is received through a handover command message.

8. The method of claim 1, wherein the random access response is a MAC (medium access control) PDU (protocol data unit), the MAC PDU comprising a MAC header and at least one MAC random access response (RAR), the MAC header comprising at least one MAC subheader, each of the at least one MAC subheader corresponding to a MAC RAR, one of the at least one MAC subheader comprising the random access preamble identifier.

9. The method of claim 8, wherein the MAC RAR comprises an uplink resource assignment and a temporary Cell-Radio Network Temporary Identity (C-RNTI).

* * * * *